(12) United States Patent
Porter et al.

(10) Patent No.: US 8,548,632 B1
(45) Date of Patent: *Oct. 1, 2013

(54) IRRIGATION CONTROLLER WITH INTEGRAL EVAPOTRANSPIRATION UNIT

(75) Inventors: La Monte D. Porter, San Marcos, CA (US); Peter J. Woytowitz, San Diego, CA (US); Christopher M. Shearin, Murrieta, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/011,301

(22) Filed: Jan. 21, 2011

Related U.S. Application Data

(63) Continuation of application No. 12/176,936, filed on Jul. 21, 2008, now Pat. No. 7,877,168, which is a continuation-in-part of application No. 10/985,425, filed on Nov. 9, 2004, now Pat. No. 7,853,363, and a continuation-in-part of application No. 11/288,831, filed on Nov. 29, 2005, now Pat. No. 7,412,303.

(51) Int. Cl.
*G05D 11/00* (2006.01)
*A01G 27/00* (2006.01)

(52) U.S. Cl.
USPC .............................. 700/284; 239/63; 239/69

(58) Field of Classification Search
USPC ................. 700/284; 239/63, 68, 69, 70, 723; 137/78.2, 78.3; 405/36, 37
See application file for complete search history.

(56) References Cited

U.S. PATENT DOCUMENTS

| | | | |
|---|---|---|---|
| 4,693,419 A | 9/1987 | Weintraub et al. | 293/63 |
| 5,097,861 A | 3/1992 | Hopkins et al. | 137/78.3 |
| 5,208,855 A | 5/1993 | Marian | 239/69 |
| 5,229,937 A * | 7/1993 | Evelyn-Veere | 700/284 |
| 5,444,611 A * | 8/1995 | Woytowitz et al. | 700/284 |
| 5,696,671 A | 12/1997 | Oliver | 700/284 |
| 5,870,302 A * | 2/1999 | Oliver | 700/11 |
| 6,088,621 A | 7/2000 | Woytowitz et al. | 700/16 |
| 6,298,285 B1 | 10/2001 | Addink et al. | 700/284 |

(Continued)

OTHER PUBLICATIONS

"Toro Partners with HydroPoint Data Systems to Develop Weather-Based Irrigation Controllers" of Athletic Turf News from Internet—E-mail address: http://athleticturf.net/athleticturf/article—article dated Jan. 16, 2004. (© 2002-2004 Advanstar Communications) 2 pages.

(Continued)

*Primary Examiner* — Charles Kasenge
(74) *Attorney, Agent, or Firm* — Knobbe Martens Olson & Bear, LLP

(57) ABSTRACT

An irrigation controller includes a first processor and a memory for storing programming executable by the first processor. The irrigation controller further includes circuitry that enables a communication link that allows direct communication between the first processor and a sensor unit containing a second processor and a plurality of environmental sensors each capable of generating an actual component of ET data. At least one manually actuable control is operably connected to the first processor for inputting further ET-related information selected from the group consisting of plant type, soil condition, growth stage and sprinkler precipitation rate. The irrigation controller further includes programming that enables the first processor to calculate optimum watering schedules based upon the actual ET data and the ET-related information including increases and decreases in the frequency and/or length of ON times for at least one station.

20 Claims, 5 Drawing Sheets

(56) References Cited

U.S. PATENT DOCUMENTS

| | | | |
|---|---|---|---|
| 6,314,340 B1 | 11/2001 | Mecham et al. | 700/284 |
| 6,453,216 B1* | 9/2002 | McCabe et al. | 700/284 |
| 6,782,311 B2 | 8/2004 | Barlow et al. | 700/284 |
| 6,823,239 B2 | 11/2004 | Sieminski | 700/284 |
| 6,892,114 B1* | 5/2005 | Addink et al. | 700/284 |
| 6,895,987 B2 | 5/2005 | Addink et al. | 137/78.3 |
| 7,146,254 B1 | 12/2006 | Howard | 700/284 |
| 7,403,840 B2 | 7/2008 | Moore et al. | 700/824 |
| 7,412,303 B1 | 8/2008 | Porter et al. | 700/284 |
| 7,430,458 B2 | 9/2008 | Dansereau et al. | 700/284 |
| 7,532,954 B2 | 5/2009 | Evelyn-Veere | 700/284 |
| 7,596,429 B2 | 9/2009 | Cardinal et al. | 700/284 |
| 2002/0072829 A1* | 6/2002 | Addink et al. | 700/284 |
| 2003/0093159 A1* | 5/2003 | Sieminski | 700/12 |
| 2003/0109964 A1 | 6/2003 | Addink et al. | 700/284 |
| 2003/0179102 A1 | 9/2003 | Barnes | 340/870.07 |
| 2003/0182022 A1 | 9/2003 | Addink et al. | 700/284 |
| 2004/0011880 A1 | 1/2004 | Addink et al. | 239/1 |
| 2004/0015270 A1 | 1/2004 | Addink et al. | 700/284 |
| 2004/0030456 A1 | 2/2004 | Barlow et al. | 700/284 |
| 2004/0039489 A1 | 2/2004 | Moore et al. | 700/284 |
| 2004/0181315 A1 | 9/2004 | Cardinal et al. | 700/284 |
| 2004/0206395 A1 | 10/2004 | Addink et al. | 137/80 |
| 2005/0038569 A1 | 2/2005 | Howard | 700/284 |
| 2005/0211791 A1 | 9/2005 | Clark et al. | 239/68 |
| 2005/0211792 A1 | 9/2005 | Clark et al. | 239/67 |
| 2005/0211793 A1 | 9/2005 | Clark et al. | 239/68 |
| 2005/0211794 A1 | 9/2005 | Clark et al. | 239/69 |
| 2005/0216127 A1 | 9/2005 | Clark et al. | 700/284 |
| 2005/0216128 A1 | 9/2005 | Clark et al. | 700/284 |
| 2005/0216129 A1 | 9/2005 | Clark et al. | 700/284 |
| 2005/0216130 A1 | 9/2005 | Clark et al. | 700/284 |
| 2006/0116792 A1* | 6/2006 | Addink | 700/284 |
| 2006/0161309 A1 | 7/2006 | Moore et al. | 700/284 |
| 2006/0184285 A1 | 8/2006 | Evelyn-Veere | 700/284 |
| 2007/0055407 A1 | 3/2007 | Goldberg et al. | 700/284 |
| 2008/0091307 A1 | 4/2008 | Dansereau et al. | 700/284 |
| 2009/0094097 A1 | 4/2009 | Gardenswartz | 705/10 |
| 2009/0099701 A1 | 4/2009 | Li et al. | 700/284 |

OTHER PUBLICATIONS

"Smart Irrigation, Made Simple" of Weathertrak © from Internet—E-mail address: http://www.hydropoint.com/—(© 2004 Hydropoint, Inc.) 1 page.

"Residential Landscape Irrigation Study Using Aqua ET Controllers" for Aqua Conserve. Denver Water, Denver, CO & City of Sonoma, CA & Valley of the Moon Water District, CA, (Jun. 2002.) 5 pages.

Aqua Conserve Products from Internet—E-mail address: http://www.aquaconserve.com/products.php—(© 2002, Aqua Conservation Systems) 5 pages.

"SRR Remote Wiring and Installation" of Hunter © The Irrigation Innovators from Internet—E-mail address: http://www.hunterindustries.com/resources/technical_bulletins/srr_remote.html—(© 2004 Hunter Industries Incorporated) 1 pg.

"Crop Evapotranspiration—Guidelines for Computing Crop Water Requirements—FAQ Irrigation and Drainage Paper 56" Attachment for link to Internet—E-mail address: http://hydrotechnic.150m.com/crop_water.html (no date) 60 pages.

East Bay Municipal Utility district (EBMUD), "Irrigation Controllers Timer for the Homeowner," US Environmental Protection Agency (EPA)—http://www.epa.gov/owm/water-efficiency/irrigation_booklet.pdf.

* cited by examiner

IRRIGATION CONTROLLER WITH INTEGRAL EVAPOTRANSPIRATION UNIT

CROSS REFERENCE TO RELATED APPLICATIONS

This application is a continuation-in-part of U.S. patent application Ser. No. 10/985,425 filed Nov. 9, 2004 of LaMonte D. Porter et al. entitled "Evapotranspiration Unit Connectable to an Irrigation Controller," which issued as U.S. Pat. No. 7,853,363 on Dec. 14, 2010. This application is also a continuation-in-part of, and claims priority from, U.S. patent application Ser. No. 11/288,831 filed Nov. 29, 2005, now U.S. Pat. No. 7,412,303 granted Aug. 12, 2008, of LaMonte D. Porter et al. entitled "Evapotranspiration Unit for Re-Programming an Irrigation Controller." This application is also a continuation of the similarly entitled U.S. patent application Ser. No. 12/176,936 filed Jul. 21, 2008, of LaMonte D. Porter, which is expected to issue as U.S. Pat. No. 7,877,168 on Jan. 25, 2011.

FIELD OF THE INVENTION

The present invention relates to electronic irrigation controllers that selectively actuate valves to supply water to sprinklers for irrigating turf and landscaping.

BACKGROUND OF THE INVENTION

In many parts of the world due to inadequate rainfall it is necessary at certain times during the year to artificially water turf and landscaping. An ideal irrigation system for turf and landscaping should utilize a minimum number of valves, supply lines and sprinklers. Preferably the valves should be turned ON and OFF by an inexpensive, yet reliable electronic irrigation controller that is easy to program and can carry out a wide variety of watering schedules. The goal is to uniformly distribute the optimum amount of water over a given area. The type, placement and flow rates for each of the sprinklers are pre-selected when an irrigation system is designed and/or installed. The optimum flow rate provided by each sprinkler should preferably fall within plus or minus one-quarter gallon-per minute (GPM). The amount of water supplied by each sprinkler is largely determined by the size and configuration of its nozzle orifice(s), although variations result from fluctuations in water pressure that cannot be fully negated with regulators.

Residential and commercial irrigation systems typically include one or more solenoid operated valves that are turned ON and OFF by the electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone. A modern electronic irrigation controller typically includes a microprocessor that executes one or more watering programs. The watering programs can, typically, be pre-programmed by the user via push button and/or rotary controls. The watering programs contain one or more watering schedules which consist of run and cycle times for each station. The controller usually has an LCD or other display to facilitate programming by the user. Often the controller will revert to a default watering program in the case of a power failure. The microprocessor controls the solenoid valves via suitable drivers and switching devices. The valves are opened and closed by the microprocessor in accordance with the pre-programmed run and cycle times for each of the stations.

Homeowners, conservationists and water purveyors are increasingly interested in minimizing the amount of water used for irrigation, especially in areas where water is in short supply. Some municipalities have enacted restrictions on residential and commercial watering. While such restrictions do save water, they are often arbitrary and do not take into account the watering needs of different types of vegetation in different geographic locations. Techniques have been developed for tailoring watering schedules in an electronic irrigation controller to accommodate different kinds of plants and atmospheric conditions based on evapotranspiration (ET) rate. This is a number that represents the amount of water lost by a plant via evaporation and also the amount of water lost by the plant through transpiration, i.e. loss of water through its leaves. See for example U.S. Pat. No. 5,097,861 granted Mar. 24, 1992 to Hopkins et al. and assigned to Hunter Industries, Inc. of San Marcos, Calif., which discloses a controller that utilizes stored historic ET data for each zip code, along with other stored data, to calculate watering schedules.

The primary environmental factors needed to calculate ET are temperature, amount of solar radiation, relative humidity and wind speed. Rainfall is not included because it is only a source of water and has little effect on how quickly plants lose water. However, an irrigation controller should take into account the effective rainfall, via rain interrupt sensor or otherwise, in determining the optimum watering schedule. Effective rainfall depends upon such things as soil type, slope and root depth as these determine the amount of water that actually makes it to the plant roots as opposed to the amount of runoff. Atmospheric conditions affect both evaporation and transpiration. Plant type also affects transpiration.

Conventional techniques for using ET data in an irrigation controller often require a fee to be paid for receiving and utilizing the ET information. Irrigation controllers capable of calculating watering schedules based on ET are typically complicated to use and expensive to buy. Those schedulers which "piggy back" onto an existing controller have limitations because they can only reduce the existing watering schedules in the base controller.

SUMMARY OF THE INVENTION

In accordance with the present invention, an irrigation controller includes a first processor and a memory for storing programming executable by the first processor. The irrigation controller further includes circuitry that enables a communication link that allows direct communication between the first processor and a sensor unit containing a second processor and a plurality of environmental sensors each capable of generating an actual component of ET data. At least one manually actuable control is operably connected to the first processor for inputting further ET-related information selected from the group consisting of plant type, soil condition, growth stage and sprinkler precipitation rate. The irrigation controller further includes programming that enables the first processor to calculate optimum watering schedules based upon the actual ET data and the ET-related information including increases and decreases in the frequency and/or length of ON times for at least one station.

DETAILED DESCRIPTION

The entire disclosures of the aforementioned co-pending U.S. patent application Ser. Nos. 10/985,425 and 11/288,831 are hereby incorporated by reference.

Figure 1:
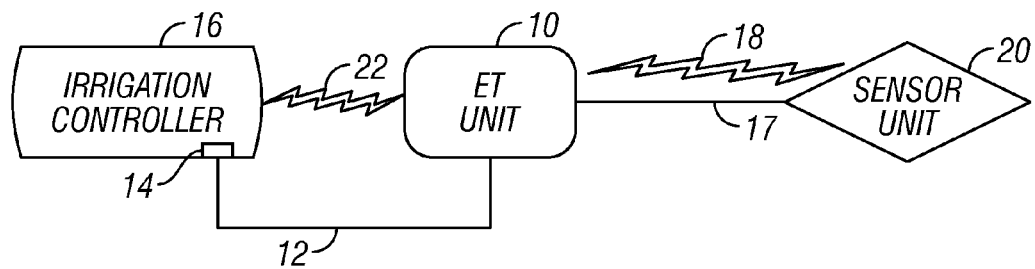
FIG. 1 is a block diagram of an evapotranspiration unit connected to a separate irrigation controller and a remote sensor unit in accordance with an embodiment of the present invention.

Referring to FIG. 1, in accordance with an embodiment of the present invention an evapotranspiration (ET) unit 10 is connected, through a hard wired communication link 12 preferably in the form of a wiring harness, to an input port 14 of a separate irrigation controller 16. The ET unit 10 is capable of changing the watering schedules of the irrigation controller 16 based on an actual (as opposed to historical) ET data, and optionally, user inputted ET-related information hereafter described. The ET unit 10 is also connected via hard wired communication link 17 or optional wireless communication link 18 to a remote sensor unit 20 that generates actual ET data. Instead of utilizing the hard wired communication link 12, the ET unit 10 can be connected to the irrigation controller 16 via optional wireless communication link 22.

The input port 14 of the irrigation controller 16 can accept a portable data shuttle (not illustrated) for uploading a watering program created on a personal computer or for directly uploading changes to an existing watering program stored in the memory of the irrigation controller 16. Thereafter, a connector on the wiring harness that forms part of the hard wired communication link 12 can be mated with a connector that forms part of the input port 14. This allows the ET unit 10 to make changes to the existing watering schedules to ensure that the minimum amount of water is used to keep the turf and other landscaping watered by the irrigation controller 16 healthy and "green." The changes that the ET unit 10 can make to the existing water schedules of the irrigation controller 16 can increase or decrease the frequency and/or length of ON times for selected stations. The changes can also include changes to start times.

The irrigation controller 16 is preferably a microprocessor based system of the type disclosed in U.S. Pat. No. 6,088,621 granted Jul. 11, 2000 to Peter J. Woytowitz et al., the entire disclosure of which is hereby incorporated by reference. The aforementioned patent is assigned to Hunter Industries, Inc., the assignee of the subject application. Irrigation controllers embodying the invention of the aforementioned patent and including the SMARTPORT (Registered Trademark) feature are commercially available from Hunter Industries, Inc. and are sold in the United States under the model designations SRC, Pro-C, ICC and ACC.

Figure 2:
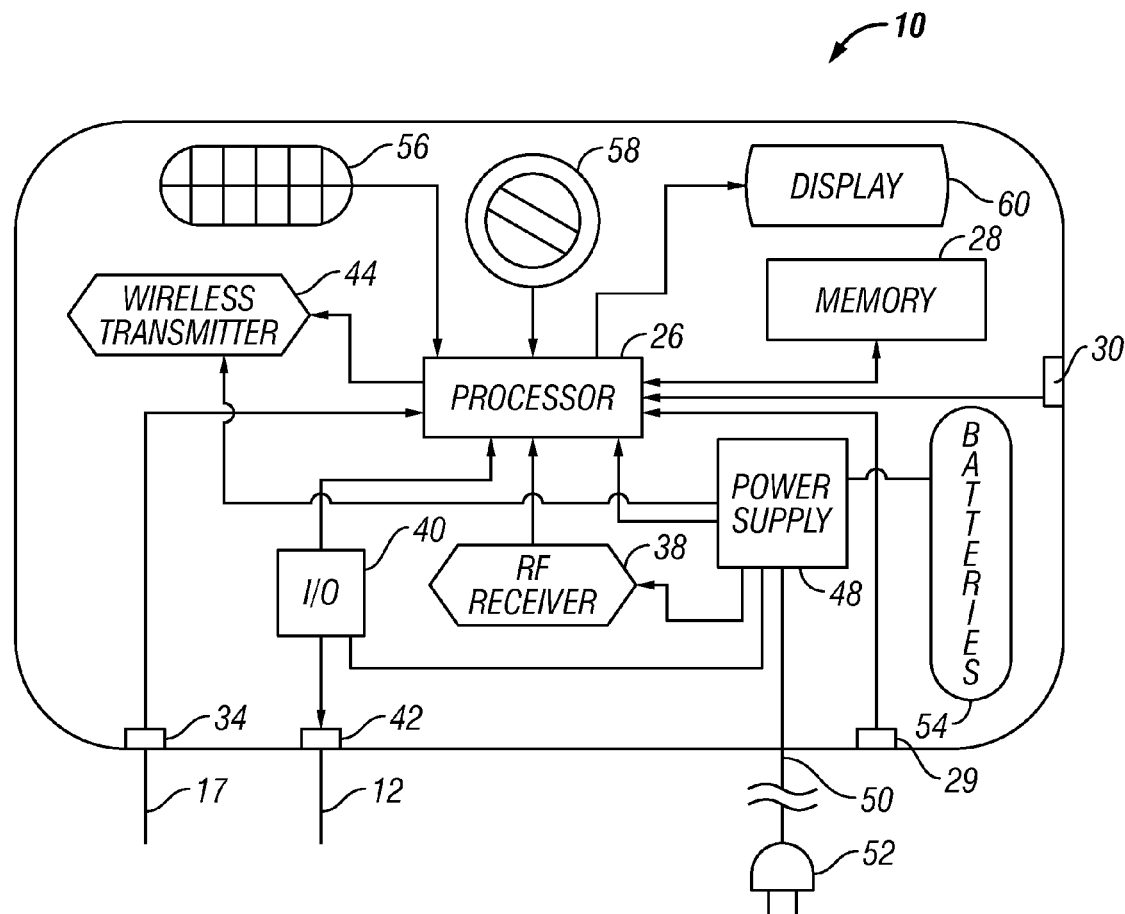
FIG. 2 is a block diagram illustrating further details of the evapotranspiration unit of FIG. 1.
Figure 5:
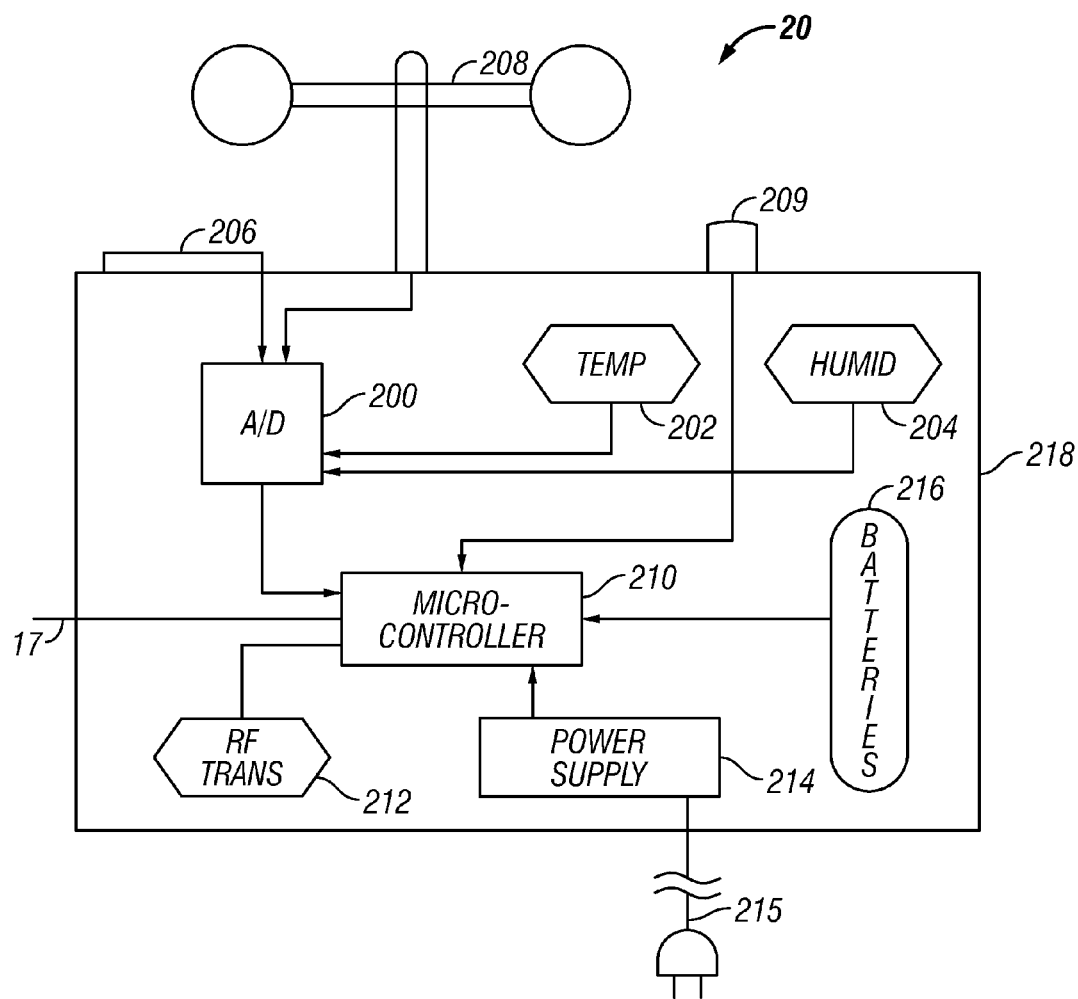
FIG. 5 is a block diagram of an embodiment of a remote sensor unit that may be used with the evapotranspiration unit of FIGS. 2 and 3.

Referring to FIG. 2, the ET unit 10 includes a processor 26. The processor 26 may be a microprocessor with an external memory 28 in the form of a RAM, ROM or EEPROM, or a single integrated circuit microcomputer having a CPU and on-chip volatile and non-volatile memory. A DIP switch 30 is connected to the processor 26 for allowing a user to manually input a preselected wind speed in the case where the sensor unit 20 does not have a wind speed sensor. A port 34 provides a connection to the hard wire communication link 17 from the processor 26 to the remote sensor unit 20. An optional RF receiver 38, which forms part of the wireless communication link 18, is connected to the processor 26. The RF receiver 38 receives signals indicative of the output of the environmental sensors in the remote sensor unit 20 via an optional RF transmitter 212 (FIG. 5). Algorithms are preprogrammed into the non-volatile memory of the processor 26 (FIG. 2), or the memory 28, for enabling the processor 26 to calculate changes to a set of watering schedules of the predetermined watering program of the irrigation controller 16 based on actual ET data transmitted by the remote sensor unit 20.

An I/O device 40 (FIG. 2) is connected to the processor 26 for communicating the changes to the irrigation controller 16 via port 42. The I/O device 40 forms part of the hard wired communication link 12 between the ET unit 10 and the irrigation controller 16 and includes means for interfacing with the processor of the irrigation controller 16 via synchronous, asynchronous or parallel data bus. Optionally the processor 26 can communicate with the irrigation controller 16 via wireless transmitter 44 which forms part of the wireless communication link 22. A power supply 48 may be connected to a one-hundred and ten volt AC source via electric cord 50 and plug 52. Batteries 54 supply standby power to ensure that any programming or data in volatile memory is not lost during a power outage. The ET unit 10 can also run off of twenty-four volts AC supplied by the irrigation controller 16.

Since the actual ET data does not cover all environmental or plant specific factors, the ET unit 10 can beneficially utilize the following ET-related information, or any permutations and combinations thereof:

Plant Types: (Based Loosely on Height and Root Depth)
1) Ground level: grass, ground cover, small plants, and other shallow root depth plants;
2) Medium level: shrubs, tropical or immature trees, ornamental plants, and other medium root depth plants; and
3) Large level: tall trees, and other plants with deep root depths.

Soil Conditions:
1) Coarse: rock, gravel, sand, high water permeability materials, and low water retention materials;
2) Medium: mixed soil, sandy loam, high organic content materials, medium water permeability materials, medium water retention materials;
3) Fine: claim soils, dense soil mixture, low water permeability materials, high water retention materials;
4) Slope: the slope or grade of the soil greatly affects the run-off rates and watering cycles;
5) Soil salinity: an optional factor that may affect the watering amount if the soil salinity is high;
6) Ground cover or surface mulch levels: another optional factor that can reduce watering amounts; and
7) Subsurface water table effects: high water tables, capillary rise and deep percolation may affect the ET number, although in most regions it has minimal effect.

Soil Types:
1) Sand;
2) Loamy sand;
3) Sandy loam;
4) Loam;
5) Clay loam;
6) Silt;
7) Clay; and
8) Silty clay.

Sun/Shade Conditions:
1) Full sun (100% of solar portion of ET);
2) Part shade (75% of solar portion of ET);
3) Part sun (50% of solar portion of ET); and
4) Full shade (25% of solar portion of ET).

Syringe:
1) Syringe events are used to prevent damage to the plant once the wilt point has been reached or exceeded;
2) The syringe option can be disabled by the user;
3) The ET unit assumes that 50-100% of the applied water will be applied to the watering budget totals based on estimated water efficiency losses; and
4) Syringe events cause 50% of the total ET daily needs to prevent multiple starts.

Slope/Runoff:
Slope or % grade is defined as Slope=Rise/Run

Growth Stages:
1) Initial: negligible to shallow to shallow root depth, ground cover between zero and ten percent evaporation predominates;
2) Crop development: ten percent to full ground cover, transpiration takes over as ground cover increases and root depth deepens;
3) Mid-season: full ground cover to start of maturity, root depth and ground coverage are at their peaks; and
4) Late-season: from the start of maturity to harvest for crops, leaf drop or plant senescence.

Precipitation Rate of Sprinklers:
1) Amount of water applied (preferably in inches per hour) by the sprinkler; and
2) Application amounts are converted to run times for the watering schedule changes.

A set of five push buttons 56 (FIGS. 2 and 3) and a rotary switch 58 are connected to the processor 26 for manually inputting further ET-related information selected from the group consisting of plant type, soil conditions, growth stages and sprinkler precipitation rates, which inputted information is displayed to the user on a display 60. The electronic circuit including the components illustrated in FIG. 2 is supported on a PC board (not illustrated) mounted behind a face plate 62 (FIG. 3) in which the push buttons 56, rotary switch 58 and display 60 are mounted. The face plate 62 is in turn supported by a box-like enclosure or back panel 64, only the perimeter of which is visible in FIG. 3. Upper and lower mounting flanges 66 and 68 extend from the back panel 64 and have holes for receiving screws for mounting the ET unit 10 on a wall adjacent the irrigation controller 16. A box-like cover 70 is connected to a vertical edge of the back panel 64 via hinge assembly 72 and may be swung closed secured to the back panel 64 via lock assembly 74.

The processor 26 supports a graphic user interface (GUI) consisting of different menus and prompts that appear when the rotary switch 58 is turned. Numbers can be entered and commands executed by pressing selected ones of the push buttons 56. For example, in the embodiment illustrated in FIG. 3, the push buttons 56a and 56b can be depressed to move a cursor left and right while depressing pushbutton 56c effectuates a select command. Depressing push buttons 56d (+) and 56e (−) effectuates moving the cursor up and down, as well as increment and decrement functions. The rotary switch 58 has nine positions, representing, in clock-wise fashion starting at the seven o'clock position, the following menu modes:

Menu Modes:
WATER DAYS
DAILY START TIME
RAIN SETTING
ET SETUP
AUTOMATIC
CONTROLLER TYPE
PLANT TYPE
SITE INFO
SPRINKLER TYPE To aid in the flexibility of the use of the ET unit 10, the user may also want to manually input externally calculated ET rates or input other adjustments to the ET data to reflect acceptable plant stress levels. This can be accomplished using keypad 56 and a rotary switch 58. The algorithms executed by the processor 26 preferably allow for user override ET rates calculated from actual ET data. For example, the California Irrigation Management Information System (CIMIS) provides daily ET rates for selected local geographic regions of that state.

The algorithms preprogrammed into the onboard memory of the processor 26 or the separate memory 28 enable the processor 26 to calculate the changes to the set of watering schedules based on manually inputted ET-related information in addition to the actual ET data, or optionally, the manually inputted ET rates. The ET unit 10 preferably calculates the changes to the watering schedule with stored algorithms that utilize a set of equations based on the Penman-Monteith, Penman, modified Penman, Hargreaves or FAO methods to estimate the reference ET in the event that only limited sensor information is available to the ET unit 10. By way of example, the ET unit 10 can calculate a station run time using the following formula:

$$T = \frac{60 \times D \times Eto \times Kc}{Pr \times IE}$$

where:
T=station run time in minutes
60=constant for conversion of flow, are, ink and in/day into common units
D=watering frequency in days
Eto=Evapotranspiration rate, in/day
Pr=Precipitation rate in in/hour
IE=application efficiency of system, percent The ET unit 10 can make the decision to turn ON a station based on the current depletion level, ET rate, plant type (crop coefficient and root zone), and if the next day is an allowable watering day. The ET unit can employ a decision tree based upon normal scheduled watering events only. The following formula is exemplary:

$$F = (TAW*RZ*MAD)/(Eto*Kc)$$

where:
F=irrigation frequency (days)
TAW=total available water capacity from field capacity to wilt point (in/ft)
RZ=root zone (ft)
MAD=Manageable allowable depletion of water (%) (MAD of 30-50% is recommended for healthy landscape)
Eto=reference ET, (in/day)
Kc=crop coefficient (unitless)

Figure 4:
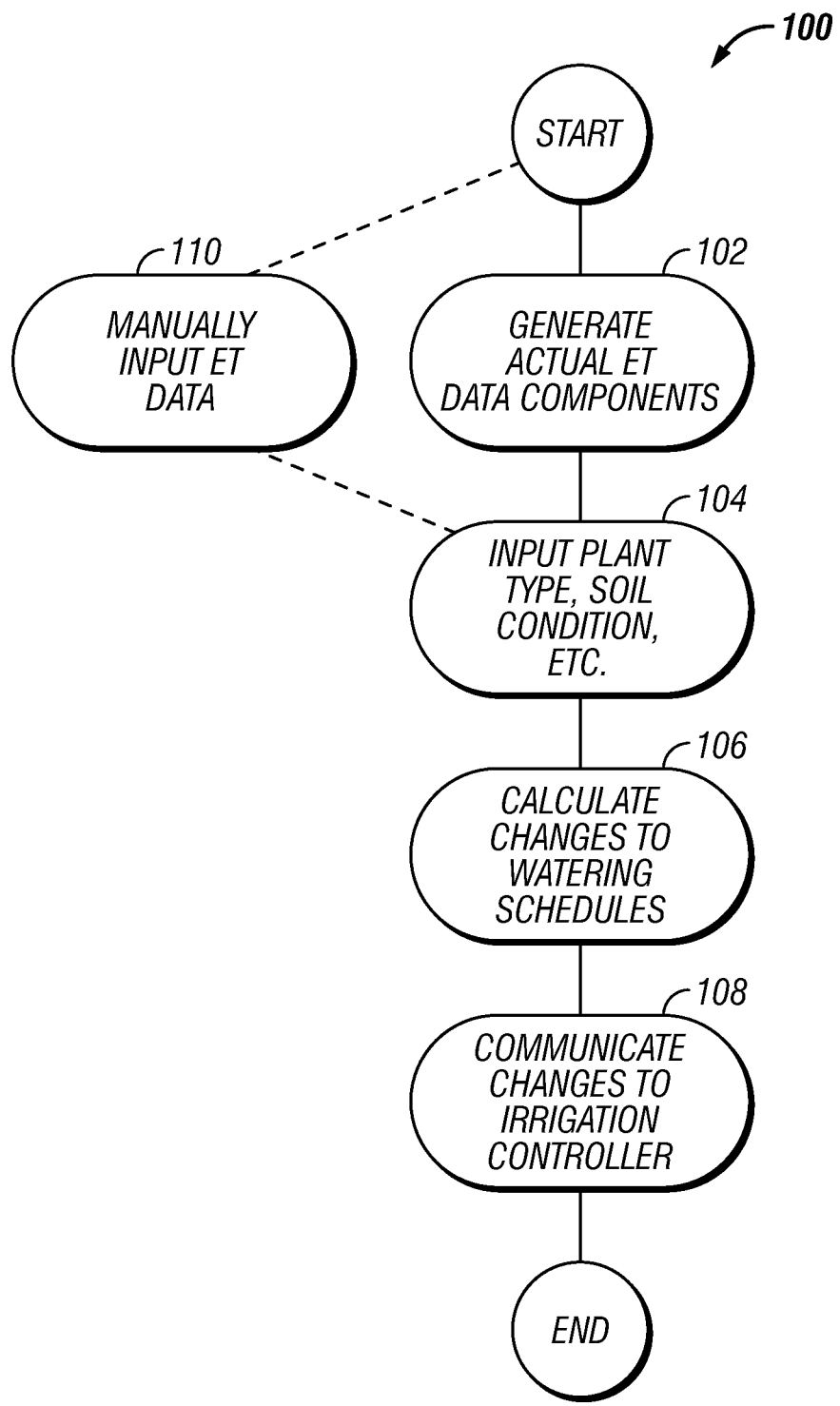
FIG. 4 is a flow diagram illustrating an embodiment of the method of the present invention.

Referring to FIG. 4, the present invention also provides a method 100 of optimizing the watering schedules of an existing irrigation controller. The first step 102 involves utilizing a plurality of environmental sensors to generate signals representing actual ET data. The next step 104 involves manually inputting further ET-related information selected from the group consisting of plant type, soil condition, growth stage and sprinkler precipitation rate. The next step 106 involves calculating changes to a set of watering schedules of a predetermined watering program of an irrigation controller based on the actual ET data and the ET-related information. The final step 108 of the method involves communicating the changes to the irrigation controller. Optionally, the method involves the alternate step 110 of calculating the changes to the set of watering schedules of the predetermined watering program based on manually inputted ET rates.

Figure 3:
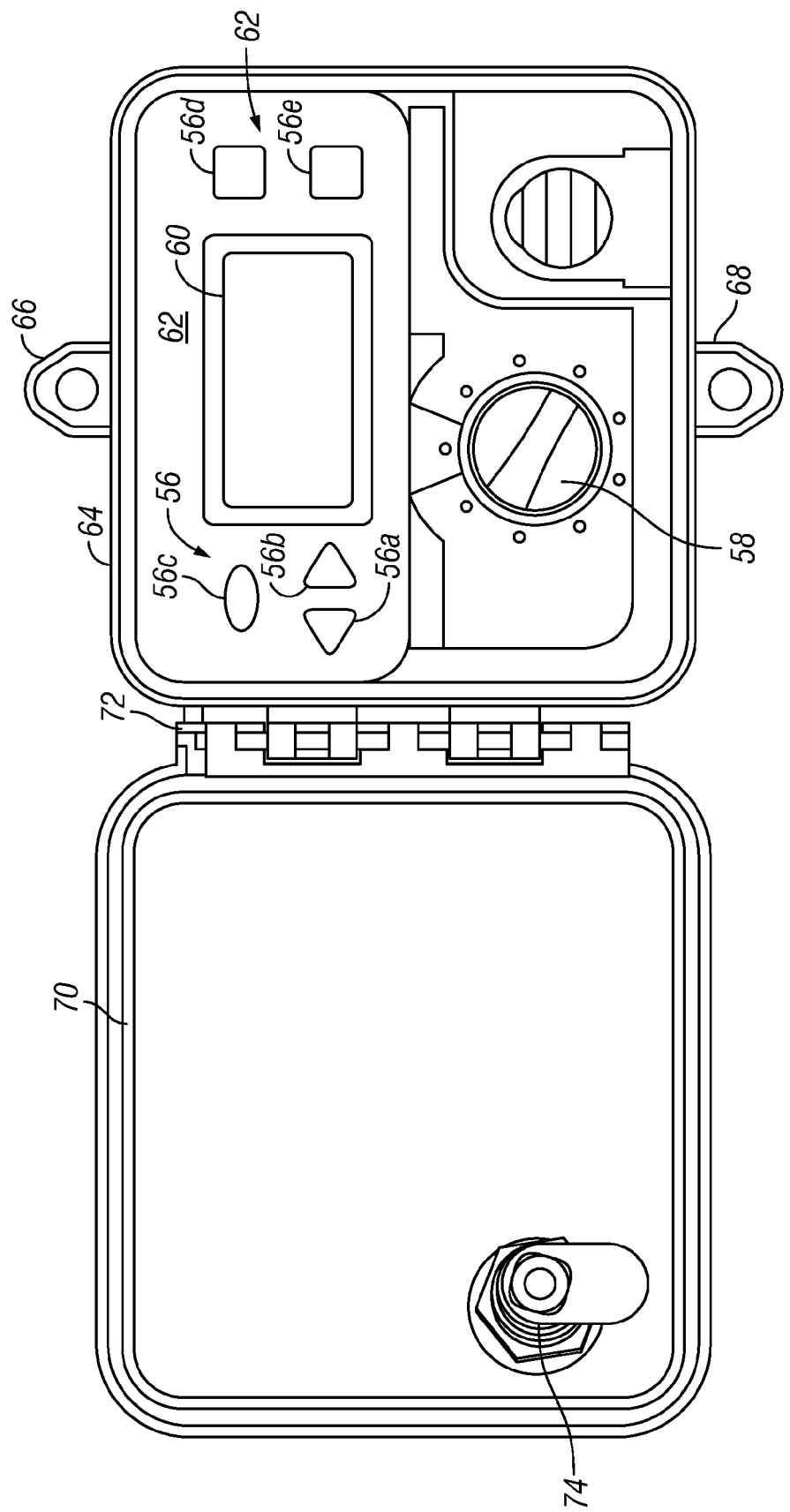
FIG. 3 is an elevation view of an embodiment of the evapotranspiration unit of FIG. 2.

FIG. 5 is a block diagram of an embodiment of the remote sensor unit 20 that may be used with the evapotranspiration unit of FIGS. 2 and 3. An analog-to-digital (A/D) converter device 200 receives analog signals from a temperature sensor 202, a humidity sensor 204, a solar radiation sensor 206, and an anemometer wind speed sensor 208. The A/D converter device 200 converts the analog signals into digital form. A wind speed sensor with a digital output may also be employed. A thermal or ultrasonic wind speed sensor could also be used. Digital signals from the A/D converter 200 are fed directly to a processor in the form of a micro-controller 210. The digital signals from the A/D device 200 and a rain sensor 209 are processed by the micro-controller 210 and encoded for sequential transmission to the ET unit 10 via RF transmitter 212 where they are received by the RF receiver 38. The rain sensor 209 is preferably the type including a vessel pivotally supported slightly off-center. Once the vessel fills sufficiently with rain water, it tips over to empty and sends a binary signal to the micro-controller 210. The signals from the rain sensor 209 are used by the processor 26 to count off of a water deficit number. The remote sensor unit 20 includes a power supply 214 connectable to an AC source via cord 215 and includes batteries 216 for standby power. The sensor unit 20 could also be powered via solar and/or wind sources.

The temperature sensor 202 and the humidity sensor 204 are preferably mounted within a plastic housing 218 that also encloses a PC board (not illustrated) that connects the various electronic components of the remote sensor unit 20. The solar radiation sensor 206 and the wind speed sensor 208 are preferably mounted to the exterior surface of the same plastic housing 218. The solar radiation sensor 206 may be of the photo-voltaic type and may be covered by a transparent protective dome (not illustrated). The environmental sensors 202, 204, 206, 208 and 209 may be individually mounted remote from the housing 218 and hard wired to the PC board. Typically the ET unit 10 will be mounted adjacent to the existing irrigation controller 14, such as on a garage wall. Usually the environmental sensors are mounted outside the garage, some distance therefrom. The remote sensor unit 20 can be mounted a considerable distance from the ET unit 10, and can transmit actual ET data to be used in calculating the watering schedule changes via the wireless link 18 (FIG. 1), thereby avoiding the signal losses otherwise encountered when signals are sent to the ET unit 10 long distance over the hard wire communication link 17.

In many locations the wind speed sensor 208 (FIG. 5) need not be incorporated into the remote sensor unit 20 because there is little variation in average wind speed. Instead, the DIP switch 30 (FIG. 2) can be slid from an inactive position to a selected one of several average wind speeds, such as 5 mph, 10 mph, 15 mph, etc. The processor then takes into account the selected average wind speed in calculating changes to the watering schedules. Considerable cost savings can thus be achieved by eliminating the wind speed sensor 208 without sacrificing significant accuracy in the determination of local ET rates.

Since the ET unit 10 can track local weather conditions and site information on the soil, it can determine the root zone moisture levels. The programming in the ET unit 10 can also determine the point at which the plant types that have been inputted are in danger of passing the wilt point and dying. Once the ET unit 10 determines that the inputted plants are within a predetermined range of the wilt point (syringe event) it can override the existing watering schedules of the irrigation controller 16 and cause immediate watering to prevent the plants from dying. This Wiltgard (Trademark) feature can trigger watering, for example, when the estimated water deficiency in the soil drops to less than five percent above the wilt point for the inputted plant type. Watering may only occur only at a particular station having the threatened plant type. The immediate watering may apply, for example, fifty percent of the field capacity of the root zone, based on the soil and plant root zone depths.

The ET unit 10 can also employ an ET Coast (Trademark) feature allowing it to keep a constant track of hourly ET rates during a twenty-four hour window. If power to the ET unit 10 and/or remote sensor unit 20 fails, the ET unit 10 can use ET rates stored over the past twenty-four hours. The ET unit 10 will use the previous ET rates for the corresponding hours of the day in order to make up for any current ET rate that is missing.

The operation of the ET unit 10 can be tailored to the user's comfort level. For example, many irrigation controllers have a water budget feature which is typically a setting that reduces all run times by a given percentage, such as ten percent. The ET unit 10 can increase all run times by a predetermined percentage in order to accommodate a hotter than normal week. The ET unit 10 can be programmed to affect the operation of the irrigation controller 16 only during certain seasons. The ET unit 10 can be programmed so that it will not affect the start times and days of the week, but will still optimize the cycle times. On the other end of the spectrum, the ET unit 10 may assume full control of all watering schedules, rather than merely scale run times. It could then control the amount of water per week, break the application into cycles if needed, and vary the frequency of applications.

The ET unit 10 differs from prior art irrigation schedulers that attach to the output lines of an existing irrigation controller leading to the solenoid actuated valves. Such schedulers can only reduce the existing watering schedules. The ET unit 10 communicates with the processor of an existing irrigation controller and effectively re-programs its existing watering schedules to optimize irrigation in accordance with actual ET data so as to keep soil and plants healthy and green with the minimum amount of water.

Figure 6:
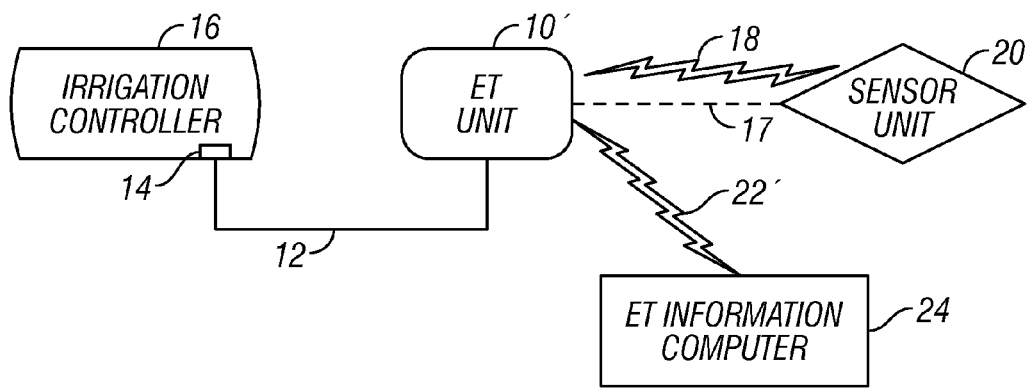
FIG. 6 is a block diagram of an alternate embodiment of the present invention.

Referring to FIG. 6, in accordance with an alternate embodiment of the present invention an ET unit 10' is connected via wiring harness 12 to the input port 14 of the irrigation controller 16 for affecting its watering schedules based on current and/or historical ET, and optionally, user inputted information such as plant types, soil conditions, growth stage and sprinkler precipitation rate. The ET unit 10' has the same configuration as that illustrated in FIG. 2 except that it has modified programming that allows it to partially use a stored historical ET data. The ET unit 10' is in turn connected via the hard wired connection 17 or the wireless link 18 to the remote sensor unit 20, and via a wireless link 22 to a computer 24 of an ET information service provider. The ET unit 10 of the alternate embodiment receives a historical set of components of ET data via input port 28 via removable media, data shuttle or PC (not illustrated) that are stored in the non-volatile memory 30. The remote sensor unit 20 generates one or more signals representing an actual value to be substituted for a corresponding one of the components of the historical set. Algorithms are preprogrammed into the non-volatile memory of the processor 26, or the memory 30, for enabling the processor 26 to calculate changes to a set of watering schedules of the predetermined watering program of the irrigation controller 16 based on any substituted actual value and the remaining historical set of components.

The RF receiver 38 (FIG. 2) can also receive an actual set of components of ET data from the computer 24 (FIG. 6) of the ET information service provider. For a monthly fee, this data is sent daily to the ET unit 10' using well known pager technology, such as offered under the Motorola trademark and service mark. Alternatively the ET unit 10' can download the actual set of components of ET data via the Internet, network connection, removable storage media or any other well known method of data communication. Default algorithms are preprogrammed into suitable flash memory for enabling the processor 26 to calculate changes to the set of watering schedules of the predetermined watering program based on the downloaded actual set of components of the ET data.

The algorithms preprogrammed into the flash memory enable the processor 26 of the ET unit 10' to calculate the changes to the set of watering schedules based on the inputted information in addition to any substituted actual value and the remaining historical set of components. Where the processor defaults to calculating changes to the set of watering schedules based on the downloaded actual set of components of ET data, the default algorithms enable the processor 26 to calculate the changes based on the inputted information in addition to the downloaded actual set of components of the ET data.

Figure 7:
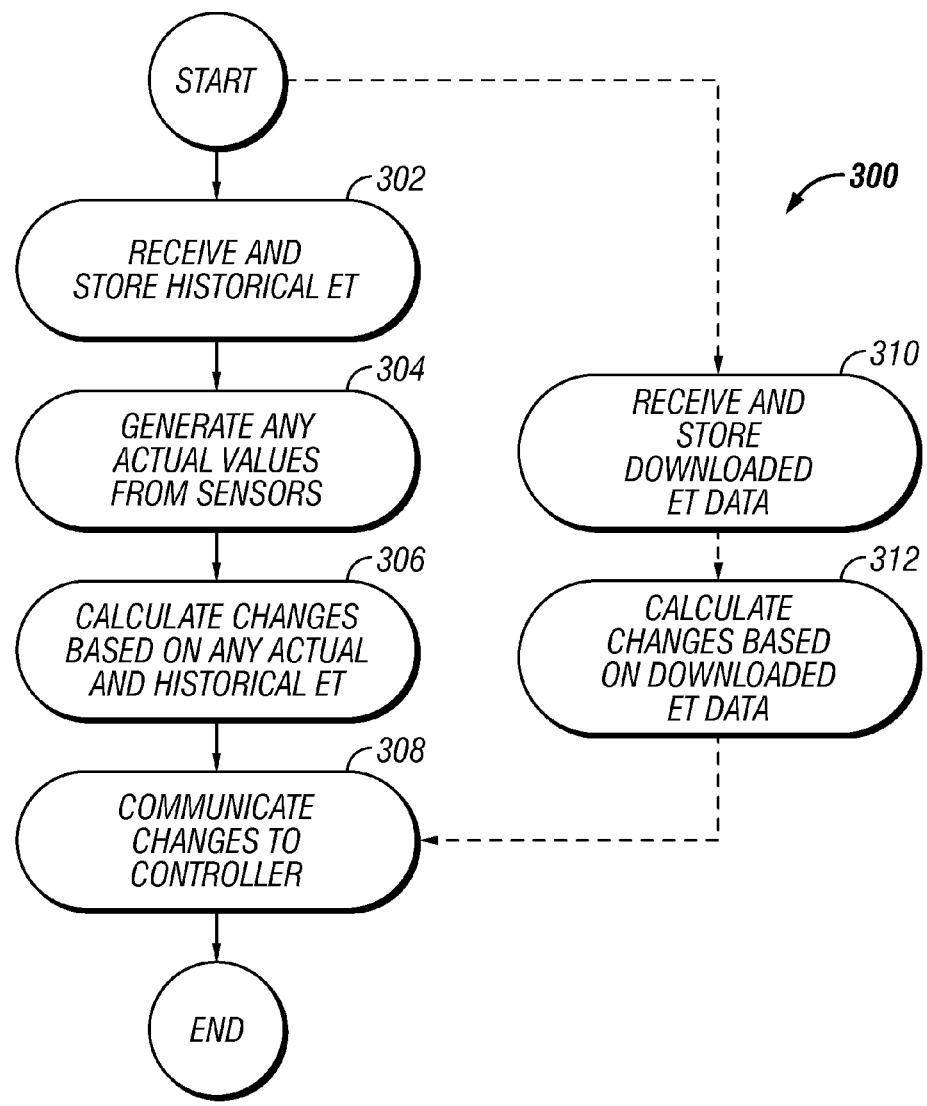
FIG. 7 is a flow diagram illustrating the operation of the alternate embodiment.

FIG. 7 illustrates the method 300 of optimizing the watering schedules of an existing irrigation controller that is performed by the alternate embodiment. The first step 302 of the method involves receiving and storing a historical set of components of ET data. The next step 304 involves utilizing one or more environmental sensors for generating one or more signals representing actual values to be substituted for corresponding components of the historical set. The next step 306 involves calculating changes to a set of watering schedules of a predetermined watering program of an irrigation controller based on any substituted actual values and the remaining historical set of components. The final step 308 of the method involves communicating the changes to the irrigation controller. Optionally, the method involves the alternate steps 310 and 312, respectively, of receiving and storing a downloaded actual set of components of ET data, and then calculating the changes to the set of watering schedules of the predetermined watering program based on the downloaded actual set of components of the ET data.

The ET unit 10' of the alternate embodiment of our invention can receive and store a historical set of components of ET data such as the temperature, humidity, solar radiation, and wind speed for a particular location for each day of the year. The ET unit 10' can also receive inputs from various environmental sensors 202, 204, 206, 208 and 209 that provide an actual value, e.g. temperature, to be substituted for the corresponding component of the historical set for that day. If no sensors are connected to the ET unit 10', the processor 26 in the ET unit 10' calculates changes to the watering schedules that provide the optimum amount of water to the landscaping based solely upon the historical set of stored ET data. These changes are communicated to the processor of the irrigation controller 16 to affect the desired changes in the watering schedules. If any environmental sensors are connected to the ET unit 10', the actual values of the sensed conditions, such as humidity, are used in place of the corresponding stored historical component for that day in calculating the watering schedule changes. Moreover, the ET unit 10' can operate in a default mode in which changes to watering schedules are calculated based solely on a downloaded actual set of components of ET data transmitted by a service provider from its computer 24 on a daily or other time interval basis.

Thus a person with an installed irrigation controller 16 can purchase the basic ET unit 10' of our invention, with stored historical ET data for specific geographic locations, connect it to the irrigation controller 16, and immediately achieve optimized watering schedules to a degree. Even better optimization can be obtained by purchasing and connecting one or more environmental sensors 202, 204, 206, 208, and 209 at additional cost. If enough environmental sensors are attached, there will be no need to use any of the stored historical ET data in calculating changes to watering schedules and these changes will be further optimized. For less cost sensitive installations, the property owner can sign up with an ET data service provider, in which case no environmental sensors need be attached to the ET unit 10'. The watering schedule changes will then be calculated solely on the basis of an actual set of components of ET data downloaded on a daily basis. The stored historical ET data is not used at all in this instance.

The ET unit 10' preferably calculates the changes to the watering schedule in the same manner, regardless of whether the ET data is all historical, all actual, or partly historical and partly actual, and regardless of the source. The calculations can be performed with stored algorithms that utilize a set of equations based on the Penman-Monteith, Penman, modified Penman, Hargreaves or FAO methods to estimate the reference ET in the event that only limited sensor information is available to the ET unit 10'.

There may be geographic regions where there is little departure from historic ET data for certain factors. In these areas there would be no need to purchase the environmental sensors or to purchase daily updated actual ET data from a service provider. The operation of the ET unit 10' can be tailored to the user's comfort level using a water budget feature. The ET unit 10' can be programmed to affect the operation of the irrigation controller 16 only during certain seasons. The ET unit 10' can be programmed so that it will not affect the start times and days of the week, but will still optimize the cycle times. On the other end of the spectrum, the ET unit 10' may assume full control of all watering schedules, rather than merely scale run times. It can then control the amount of water per week, break the application into cycles if needed, and vary the frequency of applications.

While we have described an embodiment of our ET unit 10, and an embodiment of our remote sensor unit, it will be apparent to those skilled in the art that our invention can be modified in both arrangement and detail. For example, the ET units 10 or 10' could be an integral part of the irrigation controller 16. The remote sensor unit 20 could be an integral part of the ET units 10 or 10', i.e. at least one environmental sensor could be mounted in the same housing that also encloses the processor 26. The ET units 10 or 10' could be preprogrammed to take full control of the watering schedule of the irrigation controller 10. The ET units 10 or 10' could calculate a schedule based on information programmed by the user, and then it could either: 1) load this schedule into the irrigation controller 16; or 2) use the port 14 to manually start stations at the proper time and the proper duration. The second option has another advantage in that it could implement much more complex programs than the irrigation controller 16 itself. Furthermore, it could do this somewhat cost effectively since the triacs and power circuitry, which represent a fair portion of the cost of irrigation controllers, would be in the main controller and not be duplicated in the ET units 10 or 10'. Therefore the protection afforded our invention should only be limited in accordance with the scope of the following claims.

We claim:

1. An irrigation controller comprising:
a first processor and a memory for storing programming including watering schedules executable by the first processor;
circuitry that enables a communication link that allows direct communication between the first processor and a sensor unit containing a second processor and a plurality of environmental sensors each capable of generating an actual component of ET data;
at least one manually actuable control operably connected to the first processor for inputting the watering schedules and further ET-related information selected from the group consisting of plant type, soil condition, growth stage and sprinkler precipitation rate;
programming that enables the first processor to calculate optimum watering schedules based on the actual components of ET data and the further ET-related information, the calculated optimum watering schedules including increases and decreases in the length of station ON times, increases and decreases in the frequency of watering, and changes in the start time for at least one station; and
a plurality of switching circuits operatively connected to the first processor for controlling a plurality of station valves in accordance with the optimum watering schedules.

2. The irrigation controller of claim 1 and further comprising a box-like enclosure containing the first processor and the memory and providing a support for the manually actuable control.

3. The irrigation controller of claim 1 wherein the at least one manually actuable control is one of a plurality of manually actuable controls that enable inputting of the further ET-related information.

4. The irrigation controller of claim 1 wherein the programming enables the first processor to determine that an inputted plant type is within a predetermined range of a wilt point and in response to the determination cause watering through the irrigation controller to prevent plants from dying.

5. The irrigation controller of claim 1 wherein the programming enables the first processor to store actual ET data throughout a predetermined time interval and in the event of a power failure and to calculate optimum watering schedules based on the stored actual ET data.

6. The irrigation controller of claim 1 wherein the communication link includes an RF receiver.

7. The irrigation controller of claim 1 wherein the manually actuated control includes a rotary switch.

8. The irrigation controller of claim 1 wherein the plurality of environmental sensors include at least a temperature sensor and a rain sensor.

9. The irrigation controller of claim 1 wherein the programming enables the first processor to calculate the optimum watering schedules utilizing a set of equations selected from the group consisting of Penman-Monteith, Penman, modified Penman, and Hargreaves methods.

10. An irrigation controller comprising:
a first processor and a memory for storing programming including watering schedules executable by the first processor;
circuitry that enables a communication link that allows direct communication between the first processor and a sensor unit containing a second processor and a plurality of environmental sensors each capable of generating an actual component of ET data;
at least one manually actuable control operably connected to the first processor for inputting the watering schedules and further ET-related information including at least plant type, soil type and shade conditions;
programming that enables the first processor to calculate optimum watering schedules based on the actual components of ET data and the further ET-related information, the calculated optimum watering schedules including increases in the length of station ON times; and
a plurality of switching circuits operatively connected to the first processor for controlling a plurality of station valves in accordance with the optimum watering schedules.

11. The irrigation controller of claim 10 and further comprising a box-like enclosure containing the first processor and the memory and providing a support for the manually actuable control.

12. The irrigation controller of claim 10 wherein the at least one manually actuable control is one of a plurality of manually actuable controls that enable inputting of the further ET-related information.

13. The irrigation controller of claim 10 wherein the programming enables the first processor to determine that an inputted plant type is within a predetermined range of a wilt point and in response to the determination cause watering through the irrigation controller to prevent plants from dying.

14. The irrigation controller of claim 10 wherein the programming enables the first processor to store actual ET data throughout a predetermined time interval and in the event of a power failure and to calculate optimum watering schedules based on the stored actual ET data.

15. The irrigation controller of claim 10 wherein the plurality of environmental sensors include at least a temperature sensor and a rain sensor.

16. The irrigation controller of claim 10 wherein the further ET-related information also includes soil condition.

17. The irrigation controller of claim 10 wherein the further ET-related information also includes growth stage.

18. The irrigation controller of claim 10 wherein the further ET-related information also includes sprinkler precipitation rate.

19. The irrigation controller of claim 10 wherein the further ET-related information also includes slope.

20. An irrigation controller comprising:
a first processor and a memory for storing programming including watering schedules executable by the first processor;
circuitry that enables a communication link that allows direct communication between the first processor and a sensor unit containing a second processor and a plurality of environmental sensors each capable of generating an actual component of ET data reflecting local weather conditions;
at least one manually actuable control operably connected to the first processor for inputting the watering schedules and further ET-related information including plant type, soil type and shade conditions; and
programming that enables the first processor to calculate optimum watering schedules based on the actual components of ET data and the further ET-related information, the calculated optimum water schedules including increases and decreases in the length of ON times for at least one station and increases and decreases in the frequency of ON times for at least one station.

* * * * *

UNITED STATES PATENT AND TRADEMARK OFFICE
CERTIFICATE OF CORRECTION

| | | |
|---|---|---|
| PATENT NO. | : 8,548,632 B1 | Page 1 of 1 |
| APPLICATION NO. | : 13/011301 | |
| DATED | : October 1, 2013 | |
| INVENTOR(S) | : Porter et al. | |

It is certified that error appears in the above-identified patent and that said Letters Patent is hereby corrected as shown below:

In the Specification

In column 6 at line 31, Change "ink" to --in/r--.

Signed and Sealed this
Sixth Day of May, 2014

Michelle K. Lee
*Deputy Director of the United States Patent and Trademark Office*